(12) United States Patent
Ishitaka (10) Patent No.: US 6,233,031 B1
(45) Date of Patent: *May 15, 2001

(54) LIQUID CRYSTAL DISPLAY DEVICE

(75) Inventor: Yoshihiko Ishitaka, Miyagi-ken (JP)

(73) Assignee: Alps Electric Co. Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/026,797

(22) Filed: Feb. 20, 1998

(30) Foreign Application Priority Data

Feb. 20, 1997 (JP) .................................................. 9-036722

(51) Int. Cl.⁷ .................................................. G02F 1/1335
(52) U.S. Cl. .................................................. 349/113
(58) Field of Search .................................................. 349/113, 115, 349/137, 75, 124

(56) References Cited

U.S. PATENT DOCUMENTS

| | | | |
|---|---|---|---|
| 4,842,633 | * 6/1989 | Kuribayashi et al. | 65/44 |
| 4,880,857 | * 11/1989 | Mori et al. | 523/205 |
| 5,128,787 | * 7/1992 | Blonder | 359/70 |
| 5,204,765 | * 4/1993 | Mitsui et al. | 349/113 |
| 5,220,444 | * 6/1993 | Mitsui et al. | 349/113 |
| 5,245,454 | * 9/1993 | Blonder | 359/70 |
| 5,438,421 | * 8/1995 | Sugawara et al. | 349/124 |
| 5,691,791 | * 11/1997 | Nakamura et al. | 349/113 |
| 5,714,247 | * 2/1998 | Kuo et al. | 349/113 |
| 5,777,710 | * 7/1998 | Okada et al. | 349/147 |

FOREIGN PATENT DOCUMENTS 4-243226   8/1992   (JP) .

* cited by examiner

Primary Examiner—William L. Sikes
Assistant Examiner—Dung Nguyen
(74) Attorney, Agent, or Firm—Brinks Hofer Gilson & Lione (57) ABSTRACT

A method for producing a reflector has: a step for applying a photosensitive resin onto a base member to form a photosensitive-resin layer; a step for pressing a mold, having a fine uneven pattern on the surface thereof, to the photosensitive-resin layer so as to transfer the shape of the fine uneven pattern to the photosensitive-resin layer; a step for curing the photosensitive-resin layer by radiating a light beam to the photosensitive-resin layer while pressing the mold to the photosensitive-resin layer; a step for removing the mold from the cured photosensitive-resin layer; and a step for forming a metallic reflective film on the fine uneven pattern transferred to the surface of the cured photosensitive-resin layer. Since the fine uneven pattern is formed on the photosensitive-resin layer by pressing the mold thereto and is covered with the metallic reflective film, a reflection face of the resulting reflector can obtain the shape of the fine uneven pattern transferred from the mold.

4 Claims, 7 Drawing Sheets

FIG. 12 PRIOR ART

LIQUID CRYSTAL DISPLAY DEVICE

BACKGROUND OF THE INVENTION

1. Field of the Invention

The present invention relates to a method for producing reflectors used in reflective liquid crystal display devices and the like, and liquid crystal display devices equipped with such reflectors.

2. Description of the Prior Art

Liquid crystal display devices have been widely used, since they can be produced as small, light-weight, and thin display devices. In particular, reflective liquid crystal display devices equipped with a reflective plate have taken attention because of their reduced electric-power consumption.

Figure 12:
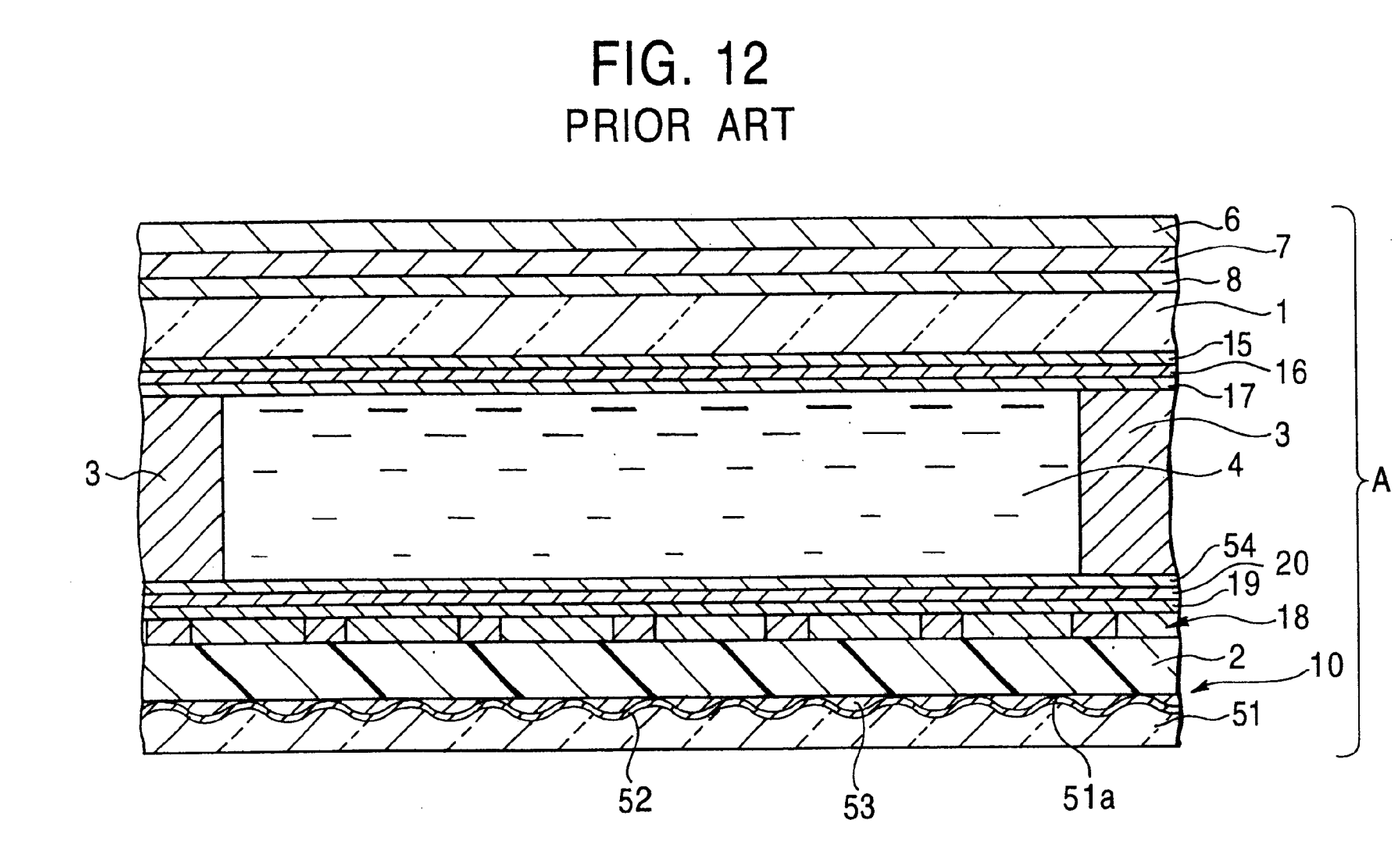
FIG. 12 is a cross-sectional view of a reflective liquid crystal display device of the prior art.

FIG. 12 shows the structure of a reflective liquid crystal display device of the prior art. This reflective liquid crystal display device A is composed of: a pair of transparent substrates 1 and 2 opposing each other; a liquid crystal layer 4 encapsulated between the pair of transparent substrates 1 and 2 by a sealing member 3; a polarizing plate 6, phase-contrast plates 7 and 8 formed on the top side of the transparent substrate 1 in that order from the top; and a reflector 10 formed on the bottom side of the transparent substrate 2. The reflector 10 is composed of: a glass substrate 51 having an uneven pattern 51a formed on the top side thereof; an Al reflective film 52 provided on the glass substrate 51, and a sticky layer 53 formed on the Al reflective film 52. An electrode layer 15 made of ITO, a top-coat layer 16, and an alignment film 17 are formed on the bottom side of the transparent substrate 1 in that order from the top. A color filter layer 18 required for color displaying, an over-coat layer 19, an electrode layer 20, and an alignment film 54 are formed on the top side of the lower transparent substrate 2 in that order from the bottom.

According to the reflective liquid crystal display device A having the above-mentioned structure, the incident light coming from the upper side of the transparent substrate 1 is transmitted through the liquid crystal layer 4, reflected by the reflective film 52, re-transmitted through the liquid crystal layer 4, and passes through the transparent substrate 1. The polarization direction of the light is controlled according to the alignment of the liquid crystal layer 4, and a bright state and a dark state of the display device can be switched by allowing or not allowing the reflected light to pass through the polarizing plate 6. The uneven pattern 51a is formed on the glass substrate 51 for rendering the reflective film 52 uneven such that light coming from the required direction is reflected and undesired light reflection is reduced.

However, in the reflective liquid crystal display device having the above structure, the reflector 10 is provided outside the thick glass substrate 2, and thus, the incident light must be transmitted through the substrate 2 after passing through the liquid crystal layer 4. A parallax thereby occurs and disadvantageously results in a reduced contrast and a double image.

For forming the uneven pattern 11a on the glass substrate 51 of the reflector 10, the glass surface is treated with hydrofluoric acid to form an uneven pattern on the surface. However, according to such a technique, the shape of the fine uneven pattern cannot be satisfactorily controlled.

It is technically important to control the shape of the uneven pattern of the reflector because light in the required direction is thereby efficiently reflected and undesired light reflection is reduced.

SUMMARY OF THE INVENTION

Accordingly, an object of the present invention is to provide a method for producing a reflector, by which method the shape of a fine uneven pattern provided for the reflector can be controlled so that the resulting reflector has an excellent reflection efficacy. Another object of the present invention is to provide a liquid crystal display device having such a reflector.

To achieve the above object, according to the present invention, a method for producing a reflector has: a step for applying a photosensitive resin onto a base member to form a photosensitive-resin layer; a step for pressing a mold, having a fine uneven pattern on the surface thereof, to the photosensitive-resin layer so as to transfer the shape of the fine uneven pattern to the photosensitive-resin layer; a step for curing the photosensitive-resin layer by radiating a light beam to the photosensitive-resin layer while pressing the mold to the photosensitive-resin layer; a step for removing the mold from the cured photosensitive-resin layer; and a step for forming a metallic reflective film on the fine uneven pattern transferred to the surface of the cured photosensitive-resin layer. Since the fine uneven pattern is formed on the photosensitive-resin layer by pressing the mold thereto and is covered with the metallic reflective film, a reflection face of the resulting reflector can obtain the shape of the fine uneven pattern transferred from the mold.

Preferably, pre-baking is carried out in a temperature range of from 40 to 150° C. after forming the photosensitive-resin layer on the base member. During pressing the mold to the photosensitive-resin layer, bubbles entering therebetween are prevented from being generated because unnecessary volatile constituents contained in the photosensitive-resin layer can be removed by pre-baking. Therefore, transferring of the uneven pattern of the mold to the photosensitive-resin layer is reliably carried out with accuracy, resulting in a desired uneven pattern.

When the pre-baking temperature is less than 40° C., an excessive amount of solvent remains in the resulting photosensitive-resin layer because of insufficient pre-baking. The residual solvent may volatilize and form bubbles by heat generated during ultraviolet radiation so that while pressing a mold to the photosensitive-resin layer, the resulting bubbles undesirably enter therebetween. When the pre-baking temperature exceeds 150° C., the flow of the photosensitive resin deteriorates. Thus, it becomes difficult to sufficiently transfer the uneven pattern to the photosensitive-resin layer.

According to the present invention, the photosensitive resin may contain at least one resist selected from the group consisting of acrylic resists, polystyrene resists, azide rubber resists, and imide resists, and the metallic reflective film may be composed of Al, an Al alloy, Ag, or an Ag alloy. By using such resists or metals, the resulting reflector achieves a high reflectance with an accurately transferred uneven pattern.

Preferably, pre-baking is carried out for 30 sec. to 10 min., both inclusive. When the pre-baking time-period is 30 sec. or less, an excessive amount of solvent remains in the resulting photosensitive-resin layer because of insufficient pre-baking. The residual solvent may volatilize and form bubbles by heat generated during ultraviolet radiation so that while pressing a mold to the photosensitive-resin layer, the resulting bubbles undesirably enter therebetween. When the pre-baking time-period exceeds 10 min., the flow of the photosensitive resin deteriorates. Thus, it becomes difficult to sufficiently transfer the uneven pattern to the photosensitive-resin layer.

In the present invention, the base member is transparent. Thus, the photosensitive-resin layer can be cured by radiating a light beam from the back-face side of the transparent base member while pressing the mold to the photosensitive-resin layer. As a result, the shape of the uneven pattern transferred to the surface of the photosensitive-resin layer can be kept as it is.

In addition, according to the present invention, the uneven pattern of the base member may be composed of: a plurality of ridges each having an almost constant height in one direction of the base member, with the heights and widths being set to random values for the ridges; and grooves each provided between the ridges and in the direction of the base member. When a reflector has such an uneven pattern, it can efficiently reflect light entering in a certain direction to a certain direction and can reduce the reflection of light entering in the undesired directions.

A reflective liquid crystal display device of the present invention has: a first transparent substrate and a second transparent substrate; a liquid crystal layer provided between the first and second transparent substrates; a polarizing plate and a phase-contrast plate provided on the side of the first substrate; and a reflector integrated with the second substrate, which reflector is prepared by the above-mentioned method of the present invention.

DESCRIPTION OF THE PREFERRED EMBODIMENT

The present invention will be better understood from the following description of the preferred embodiments taken in conjunction with the accompanying drawings.

Figure 1:
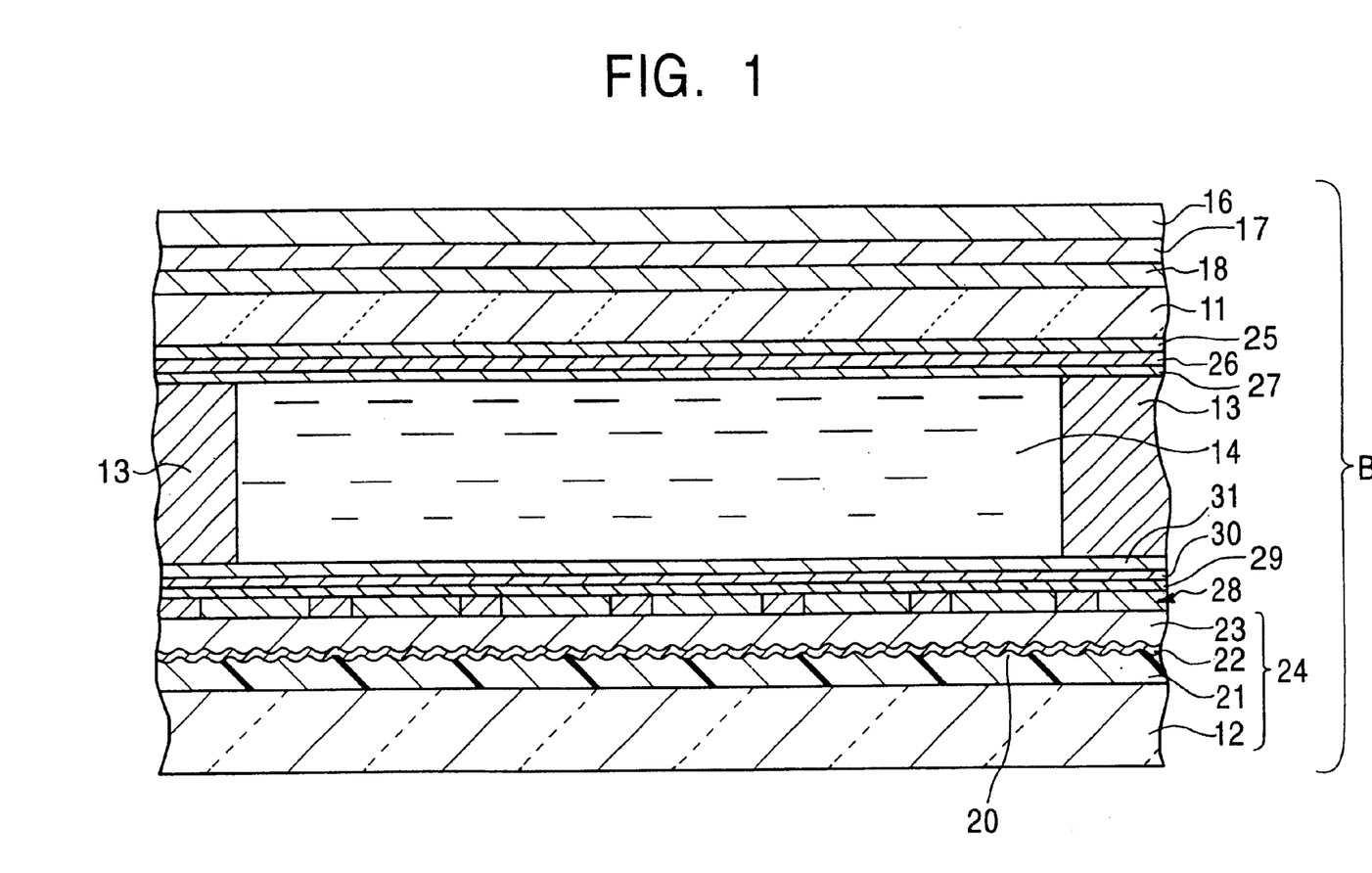
FIG. 1 is a cross-sectional view of a reflective liquid crystal display device equipped with a reflector of the present invention.

FIG. 1 shows the first embodiment of a liquid crystal display device having a reflector produced by a method of the present invention. This liquid crystal display device B is composed of: a pair of transparent substrates (i. e., base members) 11 and 12 opposing each other; a liquid crystal layer 14 encapsulated between the pair of transparent substrates 11 and 12 by a sealing member 13; and a polarizing plate 16 and phase-contrast plates 17 and 18, formed on the top side of the transparent substrate 11 in that order from the top.

A reflector 24 is integrally formed with the transparent substrate 12 as follows: a photosensitive-resin layer 21 having a fine uneven pattern 20 formed on the top side of the transparent substrate 12; a metallic reflective film 22 provided on the uneven pattern 20; and an over-coat layer 23 formed on the metallic reflective layer 22.

An electrode layer 25 made of ITO, a top-coat layer 26, and an alignment film 27 are formed on the bottom side of the upper transparent substrate 11 in that order from the top. A color filter layer 28 required for color displaying, an over-coat layer 29, another electrode layer 30, and another alignment film 31 are formed on the top side of the over-coat layer 23 in that order from the bottom.

A method for producing the reflector 24 will be described with reference to FIGS. 2 to 5.

First, a liquid of at least one photosensitive resin selected from the group consisting of acrylic resists, polystyrene resist, azide rubber resist, and imido resists is applied to the top side of the glass substrate 12 by spin coating, screen printing, blowing, or the like. In the case of spin coating, the resin liquid is trickled down to the substrate 12 while rotating the substrate 12 at approximately 500 to 700 rpm so that the entire top face of the substrate 12 is coated with the resin liquid.

Figure 2:
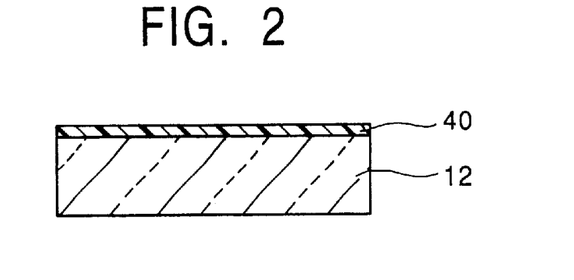
FIG. 2 is a cross-sectional diagram showing a substrate with a photosensitive-resin layer applied thereon.

To form a photosensitive-resin layer 40 on the substrate 12, as is shown in FIG. 2, the thus-applied photosensitive resin liquid is subjected to pre-baking for 10 sec. to 10 min., both inclusive, in a temperature range of from 40° C. to 150° C., both inclusive. Preferably, pre-baking is carried out for 30 sec. to 5 min., both inclusive, in a temperature range of from 60° C. to 130° C., and more preferably, for 30 sec. to 3 min., both inclusive, in a temperature range of from 80° C. to 110° C. However, since the required conditions for pre-baking vary depending on the types of photosensitive resins, the photosensitive resin liquid applied onto the substrate 12 may be pre-baked according to conditions different from the above-mentioned time-period and temperature ranges.

When the pre-baking temperature is less than 40° C., a solvent remains in the resulting photosensitive-resin layer because of insufficient pre-baking. The residual solvent may volatilize and form bubbles by heat generated during ultraviolet radiation so that while pressing a mold to the photosensitive-resin layer, the resulting bubbles undesirably enter therebetween. When the pre-baking temperature exceeds 150° C., the flow of the photosensitive resin deteriorates. Thus, it becomes difficult to sufficiently transfer the uneven pattern to the photosensitive-resin layer.

The preferred thickness of the photosensitive-resin layer 40 is in a range of from 0.5 to 5 μm.

Figure 3:
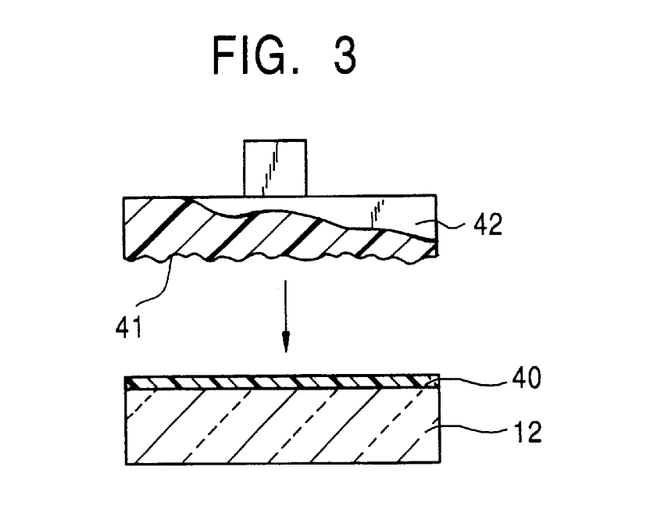
FIG. 3 is a side diagram showing the photosensitive-resin layer formed on the substrate and a mold to be pressed to the photosensitive-resin layer.
Figure 4:
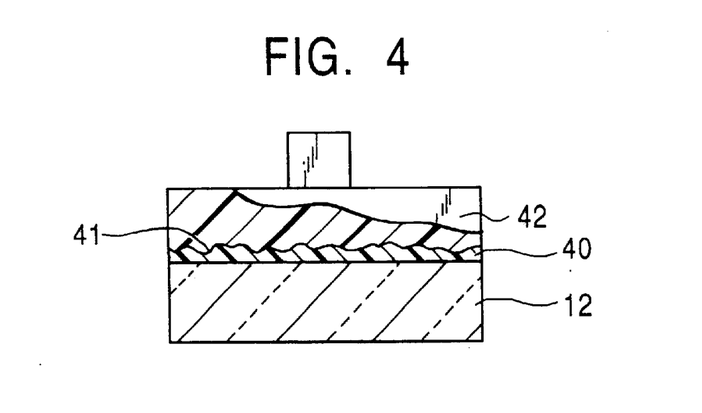
FIG. 4 is a cross-sectional diagram showing the photosensitive-resin layer formed on the substrate and the mold pressed to the photosensitive-resin layer.
Figure 5:
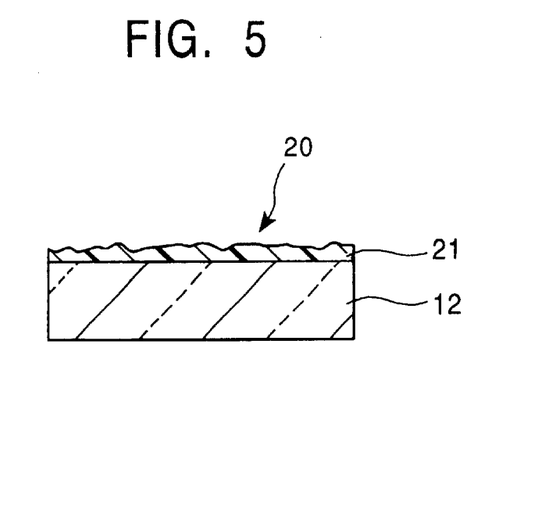
FIG. 5 is a cross-sectional diagram showing the resulting photosensitive-resin layer having an uneven pattern thereon.

As is shown in FIGS. 3 and 4, a fine uneven pattern 41 formed on the surface of a mold 42 is pressed to the photosensitive-resin layer 40 formed on the substrate 12 so as to transfer the shape of the uneven pattern 41 to the surface of the photosensitive resin 40 to form an uneven pattern 20, as is shown in FIG. 5.

The mold 42 is preferably made of a synthetic resin such as a silicone resin or an epoxy resin, or a metallic material such as Ni, Au, Cu, or Al. When the mold 42 is made of a silicone resin, it can be easily removed from the photosensitive-resin layer 40 at the subsequent separation step. When the mold 42 is made of a resin other than silicone resins or is made of a metallic material, it is preferred that a separating agent, such as a silicone oil, facilitating the separation procedure is applied to the mold before pressing. The pressure for pressing is preferably determined according to the types of photosensitive resins, and for example, it is set to 30 to 50 kg/cm$^2$. The uneven pattern 41 of the mold 42 shown in FIG. 3 is formed in such a shape that the uneven pattern 20 shown in FIG. 5 can be formed on the photosensitive-resin layer 40 by transferring the uneven pattern 41 to the photosensitive-resin layer 40.

The time-period for pressing the mold 42 to the photosensitive-resin layer 40 is preferably determined according to the types of photosensitive resins, and for example, it is set to 30 sec. to 10 min.

After pressing, light beams such as ultraviolet rays (g, h, or i rays) are radiated from the back-face side of the substrate 12 so as to cure the photosensitive-resin layer 40. Although the light intensity of 50 mJ/cm$^2$ or more is sufficient for curing the photosensitive-resin layer 40 of the above-mentioned types, the light intensity may vary depending on the types of the photosensitive-resin layers 40.

Figure 6:
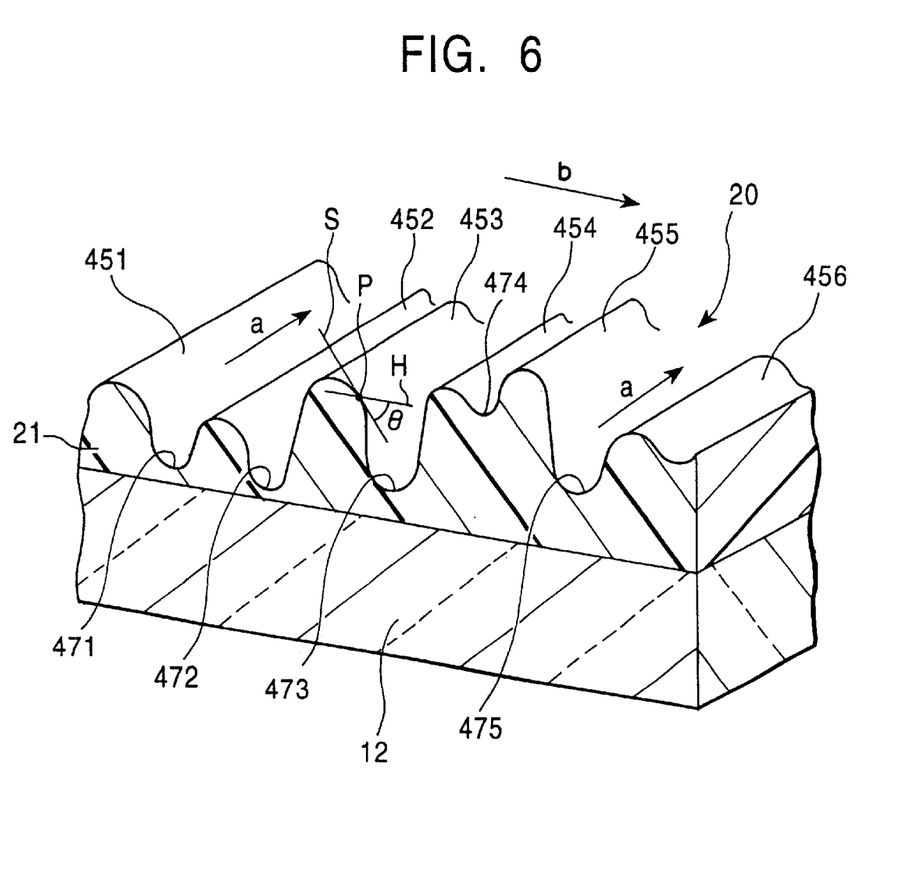
FIG. 6 is an enlarged diagram showing the uneven pattern formed on the resulting photosensitive-resin layer.

After curing the photosensitive-resin layer 40, the mold 42 is removed therefrom, and as a result, the cured photosensitive-resin layer 21 having the uneven pattern 20 is formed on the substrate 12, as is shown in FIG. 5. FIG. 6 is an enlarged view showing the form of the uneven pattern 20.

The uneven pattern 20 is formed in a wave shape, having irregular cross-sections, as follows: ridges 451, 452, 453, 454, 455, and 456 each having an almost constant height in one direction of the substrate 12 (in the direction of the arrow a shown in FIG. 6) are provided in parallel with each other at a given distance so that grooves 471, 472, 473, 474, and 475 are formed each between the ridges. The heights and widths of the ridges 451 to 456 are set to random values. Although each of the ridges has an almost constant height, it may have some ups and downs.

The distribution of the inclination angle of the uneven pattern 20 is preferably in a range of from −10° to +10°, both inclusive.

The distribution of the inclination angle is defined as the angle θ made between the horizontal line H and a tangent S at an arbitrary point P on the sinewave-like form appearing in the cross-section of the ridges. Thus, the distribution of the inclination angle in a range of from −10° to +10° means that the angle θ is in a range of from −10° to +10° at an arbitrary cross-section of the ridges shown in FIG. 6.

The reflector 24 shown in FIG. 1 can be produced as follows: the 1,000 to 2,000 Å thick metallic reflective film 22 is formed on the uneven pattern 20 by sputtering, depositing, CVD, ion-plating, electroless plating, or the like; and the over-coat layer 23 is formed on the reflective film 22 for covering the unevenness of the reflective film 22 and planarizing the surface of the reflector 24. Although Al, an Al alloy, Ag, or an Ag alloy can be used for the reflective film 22, other materials may be employed as long as they have excellent reflection characteristics.

The thus-produced reflector 24 can be applied to the reflective liquid crystal display device B having the structure shown in FIG. 1.

As is mentioned above, the uneven pattern 20 of the reflector 24 has irregular wave-form cross-sections and is composed of: ridges 451 to 456 each having an almost constant height in the a direction of the substrate 12, with the heights and widths being set to random values for individual ridges; and grooves 471 to 475 provided between the ridges. Therefore, in particular, light beams incident on the reflective film 21 in the direction (shown by the arrow b of FIG. 6) perpendicular to the a direction can be efficiently reflected by the reflector 24. As a result, the display becomes extremely bright when a user looks at the display from obliquely above the b direction.

Figure 7:
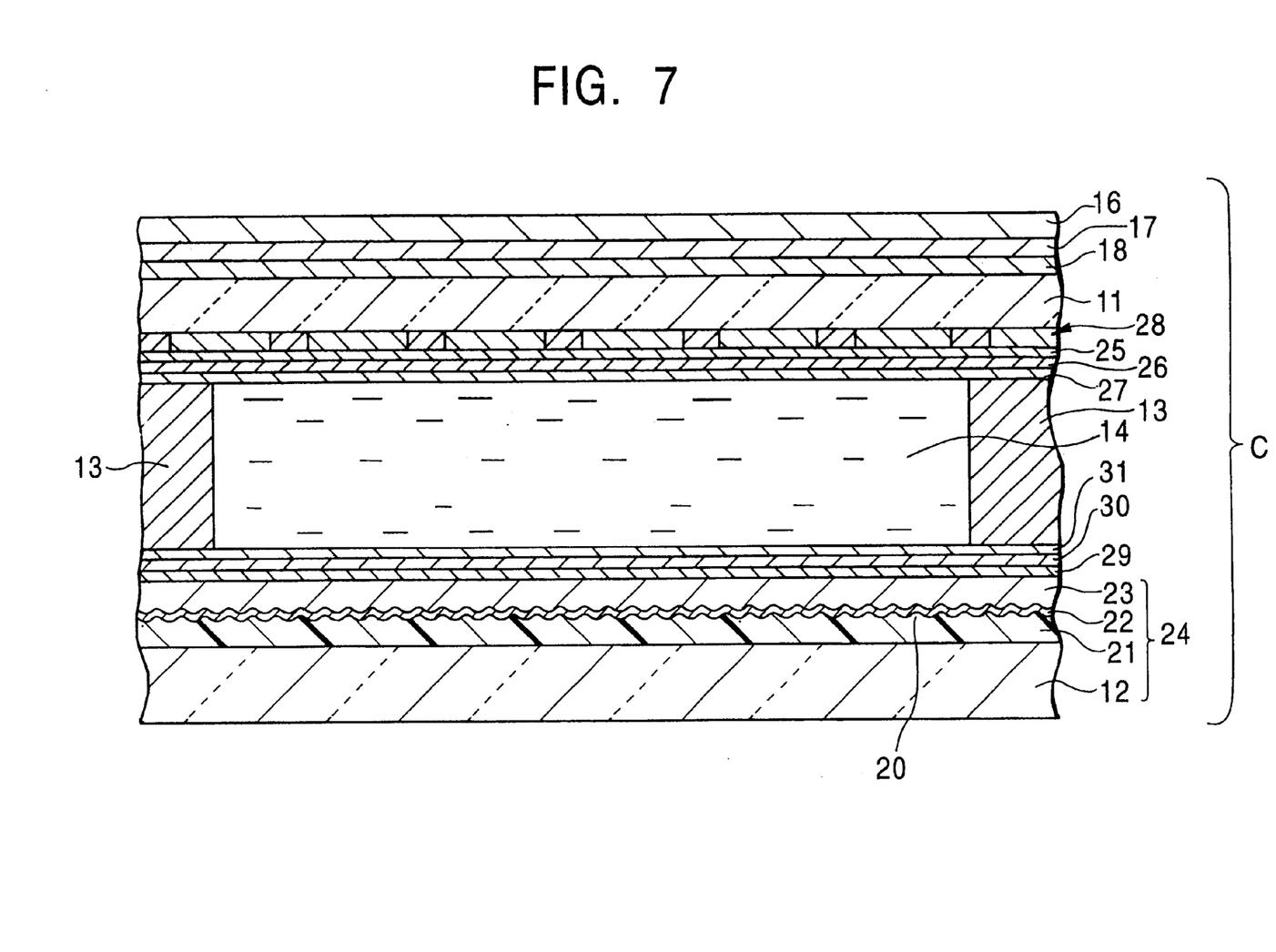
FIG. 7 is a cross-sectional view of another reflective liquid crystal display device equipped with a reflector of the present invention.

FIG. 7 shows the second embodiment of a liquid crystal display device equipped with a reflector incorporated in the present invention. This reflective liquid crystal display device C has the same structure as that of the liquid crystal display device B of the first embodiment, except that the color filter layer 28 is provided on the side of the substrate 11 in the second embodiment. Detailed explanations of parts identical to the first embodiment are thus omitted.

According to the second embodiment, a bright display can be achieved by using the reflector 24 having excellent reflection efficacy, similarly to the first embodiment.

In the above embodiments, a reflector of the present invention is applied to the reflective liquid crystal display devices B and C, however, the reflector may be used in automobiles, roads, and the like. For applying the reflector to a usage other than liquid crystal display devices, the uneven pattern of the reflector may have a different shape from the above-mentioned shape.

EXAMPLES

Example 1

A photosensitive resist (CFPRCL-016S, manufactured by Tokyo Ohka Kogyo Co., Ltd.) was applied to a glass substrate to a thickness of 5 μm using a spin coater for 30 sec. at 500 rpm.

The resist applied to the glass substrate was then pre-baked to form a resist film (photosensitive-resin film) by maintaining the glass substrate at 80° C. for 10 sec. using a hot plate.

A silicone mold having a fine uneven pattern was pressed to the surface of the resist film at a pressure of 50 kg/cm$^2$ so as to transfer the uneven pattern to the resist film. The uneven pattern of the mold was formed such that the heights and the widths of the ridges were approximately 0.5 μm to 1 μm and 5 μm to 10 μm, respectively, and the widths of the grooves were approximately 5 μm to 10 μm. Ultraviolet rays of 500 mJ/cm$^2$ were radiated to the resist film from the back-face side of the substrate while pressing the silicon mold to the resist film.

After ultraviolet radiation, a 1,500 Å thick Al film was deposited on the uneven pattern of the resist film to complete a reflector.

Example 2

A photosensitive material (JNPC-18-R10, manufactured by JSR Co., Ltd.) was applied to a glass substrate to a thickness of 3 μm using a spin coater for 20 sec. at 700 rpm.

The photosensitive material applied to the glass substrate was then pre-baked to form a resist film (photosensitive-resin film) such that the glass substrate was maintained at 60° C. for 5 sec. by a hot plate.

A silicone mold having the same fine uneven pattern as that of Example 1 was pressed to the surface of the resist film at a pressure of 30 kg/cm$^2$ so as to transfer the uneven pattern to the resist film. Ultraviolet rays of 400 mJ/cm² were radiated to the resist film from the back-face side of the substrate while pressing the silicon mold to the resist film.

After ultraviolet radiation, a 1,200 Å thick Al film was deposited on the uneven pattern of the resist film to complete a reflector.

Figure 8:
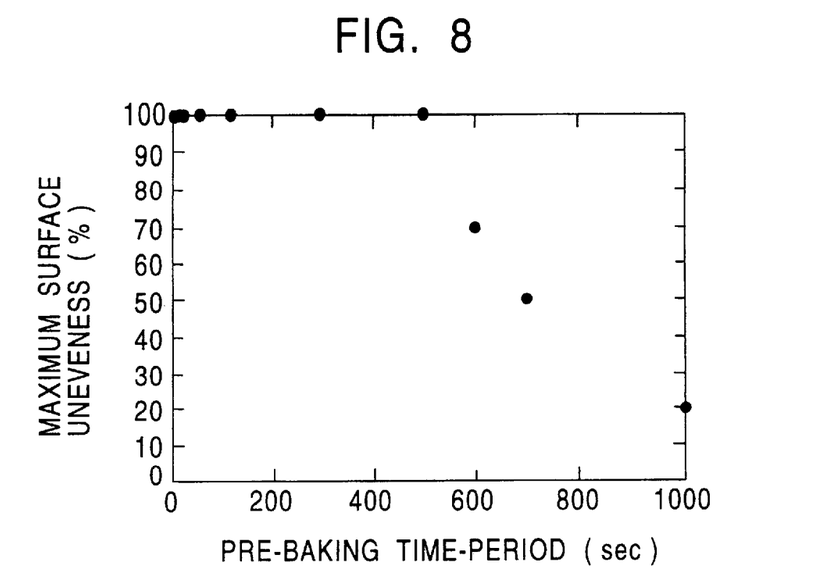
FIG. 8 shows the relationship between the maximum surface unevenness and the pre-baking time-period obtained in Example 1.

FIG. 8 shows the relationship between the maximum surface unevenness and the pre-baking time-period obtained in Example 1. The maximum surface unevenness is defined as follows:

$$\frac{\text{(Maximum unevenness of transferred region)}}{\text{(Surface unevenness of mold)}} \times 100 \ (\%)$$

Thus, the maximum surface unevenness of less than 100% means that unevenness of the mold is not transferred to the resin layer.

As is apparent from FIG. 8, the maximum surface unevenness is 100% at a pre-baking time-period of 500 sec. or less, is reduced to 70% at 600 sec., and is further reduced to 50% at 700 sec. It is understood from the result that the pre-baking time-period is preferably set to within 600 sec.

Figure 9:
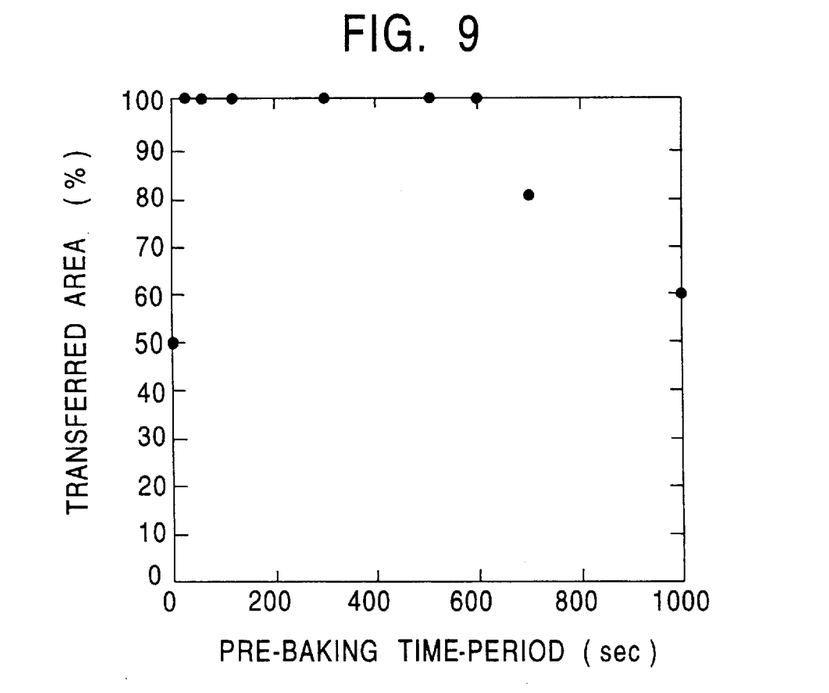
FIG. 9 shows the relationship between the area of the transferred region and the pre-baking time-period obtained in Example 2.

FIG. 9 shows the relationship between the area of the transferred region and the pre-baking time-period obtained in Example 2. The area of the transferred region is defined as follows:

$$\frac{\text{(Area of photosensitive-resin layer having unevenness thereon)}}{\text{(Area of mold having unevenness thereon)}} \times 100 \ (\%)$$

As is apparent from FIG. 9, the area of the transferred region reaches 100% at the pre-baking time-period of 10 sec., remains at 100% until 600 sec., decreases to 80% at 700 sec., and further decreases to 60% at 1,000 sec. It is understood from the result that the pre-baking time-period is preferably in a range of from 10 to 600 sec., both inclusive.

Figure 10:
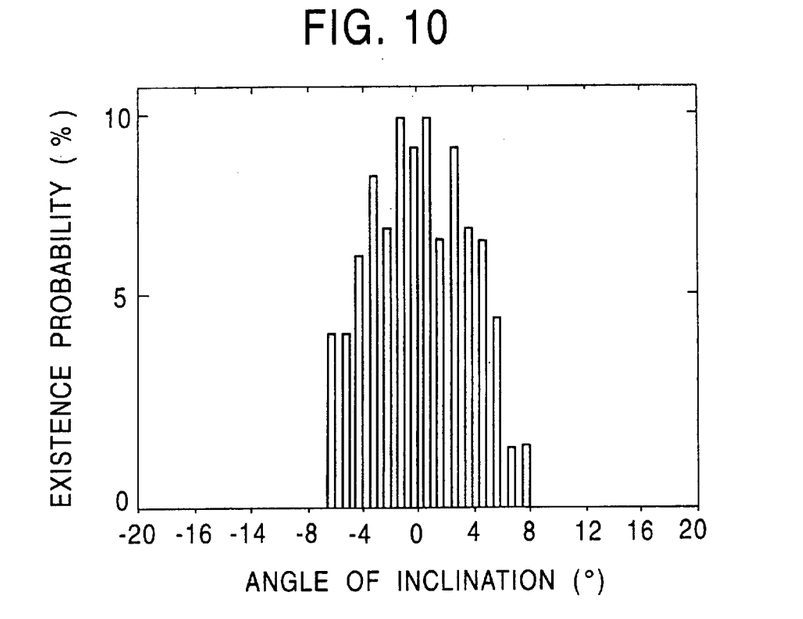
FIG. 10 shows the relationship between the angle of inclination and the existence probability of the angle obtained in Example 1.

FIG. 10 shows the relationship between the angle of inclination of the reflector and the existence probability of the angle obtained in Example 1. The existence probability is defined as the distribution of the angle of inclination in a certain area.

As is apparent from FIG. 10, the angle of inclination of the reflector obtained in Example 1 is only in a range of from −8° to +8°. It is understood from the result that the reflector of Example 1 has an appropriate shape for forming a highly reflective plate.

Figure 11:
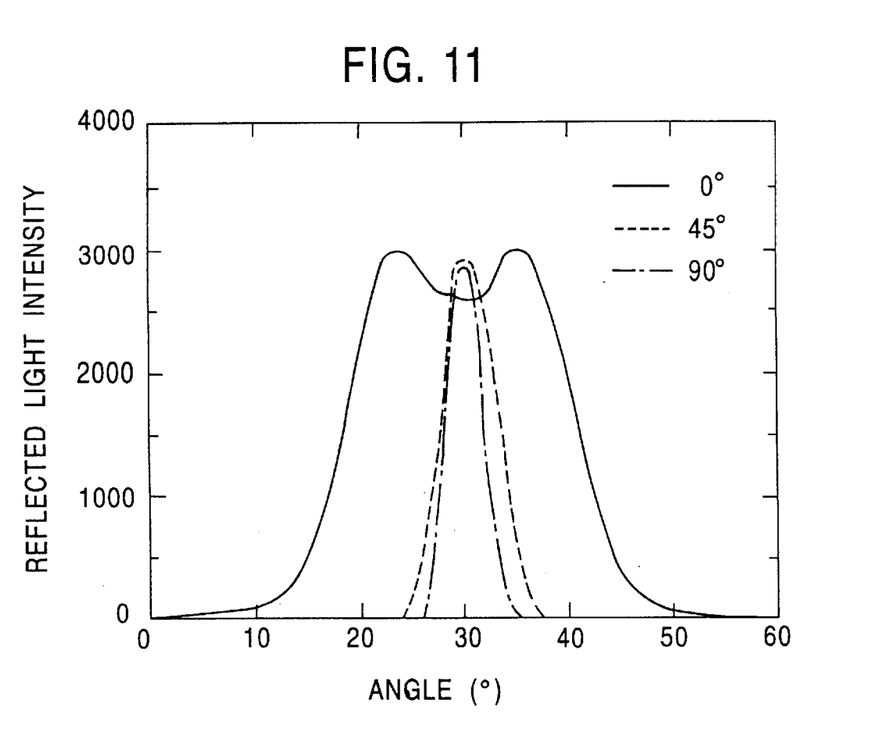
FIG. 11 shows the relationship between the intensity of the reflected light and the reflection angle obtained in Example 1.

FIG. 11 shows the relationship between the intensity of the reflected light and the reflection angle of the reflector obtained in Example 1. The intensity of the reflected light was measured for light beams entering the reflector at an incident angle of 30° in the direction perpendicular to the longitudinal direction of the ridges (0°), in the direction forming an angle of 45° with the longitudinal direction of the ridges (45°), and in the longitudinal direction of the ridges (90°), respectively.

As is apparent from FIG. 11, the range of reflection angle achieving a certain reflection intensity is wide for the light beams entering in the direction perpendicular to the longitudinal direction of the ridges (0°) and is narrow for the light beams entering in other directions (45° and 90°). It is thus understood that the reflector of Example 1 has excellent reflection properties.

Comparative Example 1

A reflector was produced according to the same method as in Example 1, except that pre-baking was carried out for 5 min. with the hot plate being set to 30° C.

As a result, a solvent remaining in the photosensitive resin volatilized and formed bubbles by heat generated during ultraviolet radiation so that while pressing the mold to the photosensitive-resin layer, the resulting bubbles undesirably entered therebetween. Thus, the uneven pattern of the mold could not be uniformly transferred to the photosensitive-resin layer.

Comparative Example 2

A reflector was produced according to the same method as in Example 1, except that pre-baking was carried out for 3 min. with the hot plate being set to 180° C.

As a result, the flow of the photosensitive resin deteriorated such that the uneven pattern of the mold could not be satisfactorily transferred to the photosensitive-resin layer.

As is described above, according to the present invention, a mold having a fine uneven pattern is pressed to a photosensitive-resin layer formed on a base member while radiating a light beam for curing the photosensitive-resin layer. A metallic reflective film is then formed on the thus-transferred fine uneven pattern of the photosensitive-resin layer. Therefore, the resulting reflector can obtain the shape of the fine uneven pattern accurately transferred from the mold.

According to the present invention, the photosensitive-resin layer can be pre-baked at 40 to 150° C. after forming the photosensitive-resin layer on the base member. A volatile solvent remaining in the photosensitive-resin layer can be thereby removed and bubbles are not formed by the heat generated in the subsequent step carried out for curing the photosensitive-resin layer. Therefore, the transferring of the uneven pattern of the mold to the photosensitive-resin layer is not impaired by bubbles.

In addition, by pressing the mold to the photosensitive-resin layer, the uneven pattern of the mold can be accurately transferred to the photosensitive-resin layer without deteriorating the area or shape of the fine uneven pattern.

According to the present invention, the uneven pattern can be composed of: a plurality of ridges each having an almost constant height in one direction of the base member, with the heights and widths being set to random values for the ridges; and grooves each provided between the ridges and in the direction of the base member. Therefore, the resulting reflector can efficiently reflect the incident light entering in the direction perpendicular to the longitudinal direction of the ridges and achieves excellent reflection efficiency in a certain direction.

In practice, for producing a reflector having excellent reflection characteristics, at least one resist selected from the group consisting of acrylic resists, polystyrene resists, azide rubber resists, and imide resists can be used as the photosensitive resin, and Al, an Al alloy, Ag, or an Ag alloy can be employed as the metallic reflective film.

A reflective liquid crystal display device of the present invention is composed of: a first transparent substrate and a second transparent substrate; a liquid crystal layer provided between the first and second transparent substrates; a polarizing plate and a phase-contrast plate formed on the side of the first substrate; and a reflector integrated with the second substrate, which reflector is prepared by the above-mentioned method of the present invention. Therefore, the reflective liquid crystal display device can be equipped with a reflector having excellent reflectance in a certain direction and it can exhibit a significantly bright display screen when viewed from a certain direction.

What is claimed is:

1. A method for producing a reflector comprising the following steps:

applying a photosensitive resin onto a base member to form a photosensitive-resin layer;

pressing a mold, having a fine uneven pattern on the surface thereof, to said photosensitive-resin layer so as to transfer the shape of said fine uneven pattern to said photosensitive-resin layer;

curing said photosensitive-resin layer by radiating a light beam to said photosensitive-resin layer while pressing said mold to said photosensitive-resin layer;

removing said mold from said photosensitive-resin layer cured; and forming a metallic reflective film on said fine uneven pattern transferred to the surface of said photosensitive-resin layer cured, wherein said fine uneven pattern of said base member comprises: a plurality of ridges each having an almost constant height in one direction of said base member, with the heights and widths being set to random values for said ridges; and grooves each provided between said ridges and provided in said direction of said base member.

2. A method for producing a reflector as set forth in claim 1, wherein said photosensitive resin comprises at least one resist selected from the group consisting of acrylic resists, polystyrene resists, azide rubber resists, and imide resists.

3. A method for producing a reflector as set forth in claim 1, wherein said metallic reflective film comprises Al, an Al alloy, Ag, or an Ag alloy.

4. A method for producing a reflector as set forth in claim 1, wherein after forming said photosensitive-resin layer on said base member, pre-baking is carried out in a temperature range of from 40 to 150° C.

* * * * *